Aug. 26, 1969    R. M. LAMB    3,463,561
SNOWMOBILE BOGIE WHEEL
Filed Feb. 27, 1968    2 Sheets-Sheet 1

INVENTOR
ROBERT M. LAMB

BY
ATTORNEY

United States Patent Office 3,463,561
Patented Aug. 26, 1969

3,463,561
SNOWMOBILE BOGIE WHEEL
Robert M. Lamb, 915 Oswego St.,
Liverpool, N.Y. 13088
Filed Feb. 27, 1968, Ser. No. 708,589
Int. Cl. B62d 55/14
U.S. Cl. 305—27                                    7 Claims

ABSTRACT OF THE DISCLOSURE

Snowmobiles having belt-type endless tracks are conventionally provided with bogie wheels pivotally mounted on a main shaft fixed to the vehicle frame. The bogie wheels are spring pressed downwardly to engage the belt at points forwardly of the shaft. When the belt encounters an undersnow hard object, the bogie wheels may be thrown upwardly so high that the belt hits the shaft, bending it and/or damaging the belt.

The present improvement provides stops that engage the belt limiting its upward movement, the forces being translated to the shaft at points near its supported ends.

---

This invention relates to an improvement in a snowmobile which may be of the usual design provided with a power driven, resilient, belt-type, endless track and steering runners, or the endless track system may correspond to that of my co-pending application, Ser. No. 700,069, filed Jan. 24, 1968, entitled Endless Track Vehicle.

Snowmobiles are conventionally provided with at least one bogie wheel assembly. Such assembly is supported by a main shaft secured at its ends to the vehicle frame transversely thereof. A bracket pivoted on the shaft carries a pair of laterally spaced bogie wheels spring biased downwardly to engage the track forwardly of the main shaft.

Snowmobiles occasionally are driven over raised hard, snow-buried objects such as stones or the like. The upward impacting force on the track may be sufficient to throw the bogie wheels upwardly so far that the track hits the main shaft hard enough to bend or otherwise damage the shaft.

Also the belt-type usually has protuberants, such as heads of rivets which secure the track cleats to the belt. In case a track of the type disclosed in my above mentioned co-pending application is employed, the protuberants include rows of track alignment guide plates centrally secured on the belt. If these plates strike the bogie wheel main shaft at any appreciable speed of the snowmobile, they may be torn off the belt.

It is the object of this invention to provide a simple and effective stop means preventing the belt, or any protuberant on it, from hitting the bogie wheel main shaft, the stop means being constructed such that the forces of impact are translated to the shaft at points near its supported ends, remote from its center, thus to prevent damaging the belt and to minimize danger of bending the shaft, without necessitating enlarging the shaft beyond the size needed for the normal bogie wheel assembly support.

For a detailed description of the invention reference is made to the accompanying drawing in which.

Figure 1:
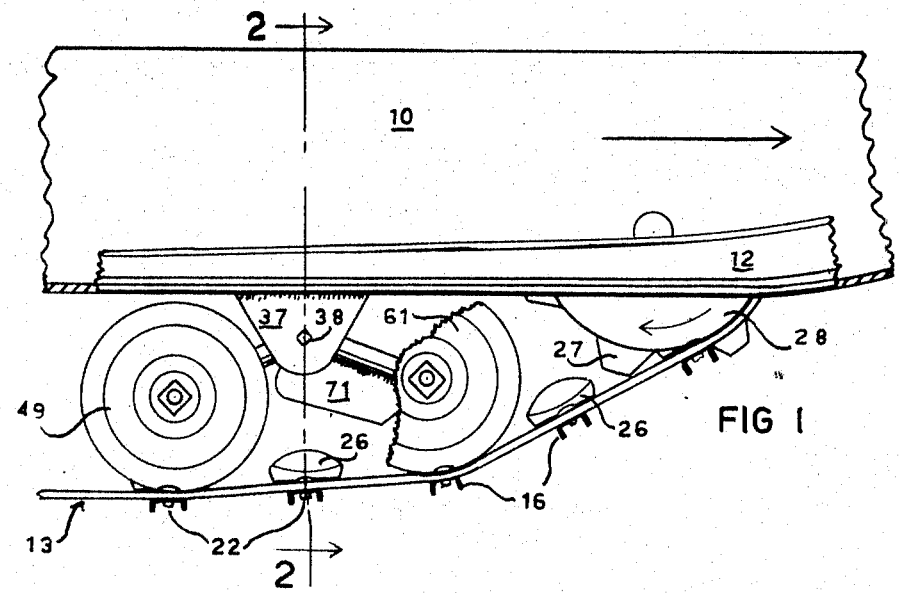
FIGURE 1 is a side elevation of a portion of the front end of a snowmobile chassis with parts broken away.
Figure 2:
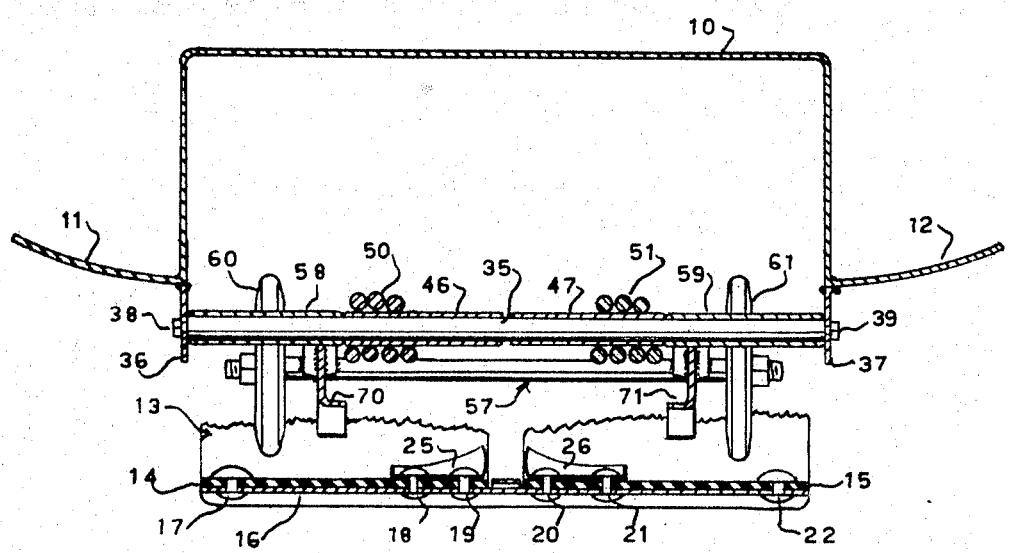
FIGURE 2 is a section on line 2—2 of FIGURE 1 with background parts omitted.
Figure 3:
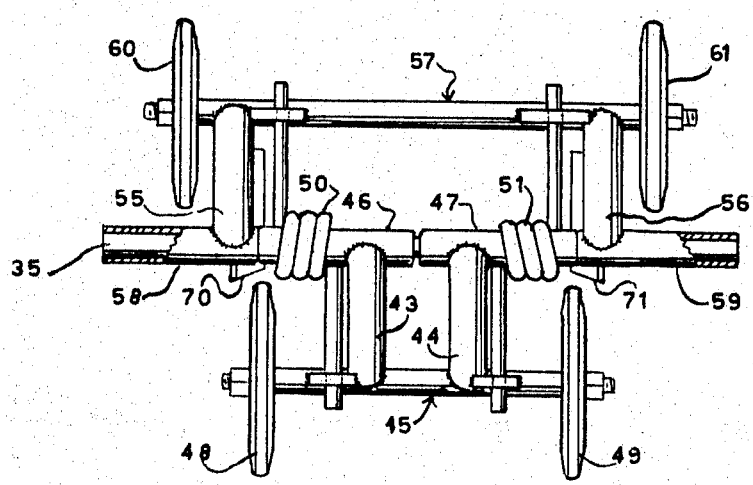
FIGURE 3 is a top plan view of the bogie wheel assembly separate from the vehicle chassis.
Figure 4:
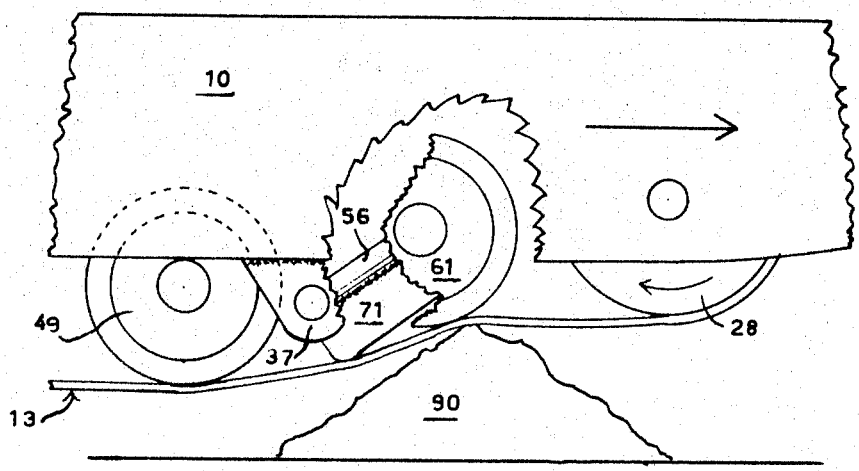
FIGURE 4 is a view corresponding to FIGURE 1, structural details being omitted, showing the snowmobile passing over a stone to illustrate functioning of the track stop means.

The vehicle chassis has an integral body and frame 10, and running boards 11 and 12. The track 13 has two reinforced, resilient material ribbons 14 and 15 held spaced apart by track cleats 16. The cleats are secured to the ribbons with rivets, such as shown at 17, 18, 19, 20, 21 and 22. The heads of these rivets form protuberants on the inside surface of the track.

Rows of track alignment guide plates, such as the plates shown at 25 and 26, are also secured to the track and protrude inwardly.

The track is driven by a powered sprocket wheel 27, the teeth of which engage against the track cleats. Track tension wheels, one of which is shown at 28, support the track as explained in my above mentioned co-pending application.

The forwardmost bogie wheel assembly comprises a main shaft 35 supported at its ends transversely of the frame on ears 36 and 37 welded to the frame. Stud bolts 38 and 39 secure the shaft in place.

The legs 43 and 44 of a U-shaped bracket 45 are welded to sleeves 46 and 47 pivoted on the main shaft, the bracket supporting bogie wheels 48 and 49. These bogie wheels are pressed downwardly by spring means comprising coils 50 and 51, the bogie wheels engaging the track on a smooth area between protuberants at points longitudinally rearwardly offset from the main shaft.

Two legs 55 and 56 of another U-shaped bracket 57 are welded to sleeves 58 and 59. Bracket 57 is also pivoted on the main shaft and supports bogie wheels 60 and 61. These bogie wheels are pressed downwardly by the same spring means, and engage the track on a smooth area at points on opposite sides of the track center and longitudinally forwardly offset from the main shaft.

The bogie wheel assembly thus far described is conventional. The particular structure of the present improvement comprises the plates 70 and 71 welded to the legs 55 and 56 of bracket 57.

These plates form stops that project downwardly towards the track. On normal terrain, the lower surfaces of the stops ride well above the surface of the track, as viewed in FIGURE 1, for example. However, if a hard object, such as a rock 90, is struck by the track, the bogie wheels 60 and 61 are thrown upward until the track engages against the lower surfaces of the stops. The stops project sufficiently far down that in any upward pivoting of the bogie wheels and bracket beyond their normal operational limit, the track, and any protuberants on it, are prevented from contacting the main shaft. The forces are traslated from the track through the stops and bracket legs to the shaft at points remote from its center. The stops engage the track on smooth areas approximately in alignment with the bogie wheels 48 and 49.

The brunt of shock when the track contacts an undersnow hard object is sustained by the front bogie wheels, they being first encountered. It is most advantageous to equip such bogie wheels with the stops. This usually is all that is needed.

I claim:

1. A snowmobile comprising a frame, a power driven, resilient, belt-type endless track, and a bogie wheel assembly having a shaft, means at the ends of the shaft for mounting it on the frame transversely thereof, a bracket swiveled on the shaft, a bogie wheel rotatably supported on the bracket, spring means for pressing the bogie wheel downwardly to engage the track at a point offset longitudinally from the shaft, and stop means supported by said shaft and positioned between the sides of the belt vertically spaced beneath said shaft to contact the track to prevent said track from hitting the shaft if the bracket is pivoted upwardly beyond its normal operational limit as the track is forced upwardly due to passage over raised objects on a snow covered terrain.

2. The snowmobile of claim 1 in which the stop means comprises two stops, one positioned to engage the track at a point to one side of its center and the other positioned to engage the track at a point to the other side of its center, the stops translating force from the track to the shaft at points remote from its center, thus to prevent damage to the shaft.

3. A snowmobile comprising a frame, a power driven, resilient, belt-type, endless track, and a bogie wheel assembly having a shaft, means at the ends of the shaft mounting it transversely on the frame, a bracket swiveled on the shaft, a bogie wheel rotatably supported on the bracket to one side of the center of the track, a second bogie wheel rotatably supported on the bracket to the other side of the center of the track, spring means for pressing the bogie wheels downwardly to engage the track at points offset longitudinally forwardly from the shaft, and stop means positioned to contact the track on opposite sides of the center of the track, the stop means supported by said shaft and positioned between the sides of the track vertically spaced beneath said shaft acting to prevent the track hitting the shaft if the bracket is pivoted upwardly beyond its normal operational limit as the track is forced upwardly due to passage over raised objects on a snow covered terrain, and acting to translate forces from the track to the shaft at points remote from its center, thus to minimize damage to the shaft.

4. The snowmobile of claim 3 in which metal protuberants are fixed to the track on its surface adjacent the shaft, the bogie wheels and stops engaging the track on portions free of the protuberants, whereby the stop means prevent the protuberants from hitting the shaft, thus to prevent destruction of the track.

5. The snowmobile of claim 4 in which the protuberants comprise track alignment plates.

6. The snowmobile of claim 3 in which the stop means comprise a stop fixed to each bracket, whereby the forces are translated from the stops through the brackets to the shaft.

7. The snowmobile of claim 1 in which the bogie wheel is the first one to be encountered by the raised object as the snowmobile travels forwardly.

References Cited

UNITED STATES PATENTS

| | | | |
|---|---|---|---|
| 2,393,993 | 2/1946 | Knox | 305—27 X |
| 3,023,824 | 3/1962 | Bombardier | 305—27 X |
| 3,309,150 | 3/1967 | Marier | 305—27 |
| 3,362,492 | 1/1968 | Hansen | 180—9.24 X |

RICHARD J. JOHNSON, Primary Examiner